(12) United States Patent
Ji et al.

(10) Patent No.: US 10,506,627 B2
(45) Date of Patent: Dec. 10, 2019

(54) METHOD AND APPARATUS FOR TRANSCEIVING CHANNEL RELATED TO TERMINAL THAT SUPPORTS HALF DUPLEX TRANSMISSION IN MOBILE COMMUNICATION SYSTEM

(71) Applicant: Samsung Electronics Co., Ltd., Gyeonggi-do (KR)

(72) Inventors: Hyoung Ju Ji, Seoul (KR); Young Bum Kim, Seoul (KR); Joon Young Cho, Suwon-si (KR); Seung-Hoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/796,664

(22) Filed: Oct. 27, 2017

(65) Prior Publication Data
US 2018/0054833 A1    Feb. 22, 2018

Related U.S. Application Data

(63) Continuation of application No. 14/382,307, filed as application No. PCT/KR2013/001574 on Feb. 27, 2013, now Pat. No. 9,832,789.
(Continued)

(51) Int. Cl.
*H04W 72/12* (2009.01)
*H04B 7/26* (2006.01)
(Continued)

(52) U.S. Cl.
CPC ...... *H04W 72/1289* (2013.01); *H04B 7/2643* (2013.01); *H04B 7/2656* (2013.01);
(Continued)

(58) Field of Classification Search
CPC ......... H04W 72/1289; H04J 3/00; H04L 5/16; H04L 27/2602; H04L 5/0094; H04B 7/2656; H04B 7/2643
See application file for complete search history.

(56) References Cited

U.S. PATENT DOCUMENTS

| | | | |
|---|---|---|---|
| 8,780,767 | B2 | 7/2014 | Wang |
| 9,900,084 | B2 * | 2/2018 | Ahn ............... H04B 7/2656 |

(Continued)

FOREIGN PATENT DOCUMENTS

| | | |
|---|---|---|
| CN | 101606347 A | 12/2009 |
| CN | 102137500 A | 7/2011 |

(Continued)

OTHER PUBLICATIONS

LG Electronics, "Overall Issues on Half-Duplex Operation Based TDD CA with Different UL-DL Configuration", R1-120421, 3GPP TSG-RAN WG1 #68, Dresden, Germany, Feb. 6-10, 2012, 7 pages.
(Continued)

*Primary Examiner* — Andrew Lai
*Assistant Examiner* — Harry H Kim

(57) ABSTRACT

Disclosed are a method and an apparatus for transceiving a channel related to a terminal that supports half duplex transmission in a mobile communication system. The terminal receives scheduling information on multi-carriers having different TDD configurations from a base station, determines whether to receive a downlink channel for a plurality of different subframes of each multi-carrier including at least one special subframe, and transceives a channel to/from the base station depending on whether the downlink channel is received or not.

20 Claims, 14 Drawing Sheets

Related U.S. Application Data

(60) Provisional application No. 61/604,603, filed on Feb. 29, 2012.

(51) Int. Cl.
| | | |
|---|---|---|
| *H04L 5/00* | (2006.01) | |
| *H04L 27/26* | (2006.01) | |
| *H04J 3/00* | (2006.01) | |
| *H04L 5/16* | (2006.01) | |

(52) U.S. Cl.
CPC .............. *H04J 3/00* (2013.01); *H04L 5/0094* (2013.01); *H04L 5/16* (2013.01); *H04L 27/2602* (2013.01)

(56) References Cited

U.S. PATENT DOCUMENTS

| | | |
|---|---|---|
| 2011/0032855 A1 | 2/2011 | Kim et al. |
| 2011/0176435 A1 | 7/2011 | Khandekar et al. |
| 2011/0317670 A1 | 12/2011 | Zhang et al. |
| 2012/0020256 A1 | 1/2012 | Tujkovic et al. |
| 2012/0020315 A1 | 1/2012 | Astely et al. |
| 2012/0201318 A1 | 8/2012 | Seo et al. |
| 2014/0036742 A1* | 2/2014 | Charbit ............. H04W 52/0235 370/280 |
| 2014/0092794 A1 | 4/2014 | Yang et al. |
| 2016/0156455 A1* | 6/2016 | Park .......................... H04L 5/14 370/280 |

FOREIGN PATENT DOCUMENTS

| | | |
|---|---|---|
| KR | 101095811 B1 | 12/2011 |
| WO | 2011011758 A1 | 1/2011 |

OTHER PUBLICATIONS

Nokia Siemens Networks, et al., "Views on Inter-Band CA with Different TDD Configurations on Different Bands", R1-114309, 3GPP TSG-RAN WG1 Meeting #67, San Francisco, California, Nov. 14-18, 2011, 7 pages.

International Search Report dated Jun. 1, 2013 in connection with International Patent Application No. PCT/KR2013/001574, 4 pages.

Written Opinion of International Searching Authority dated Jun. 1, 2013 in connection with International Patent Application No. PCT/KR2O13/OO1574, 7 pages.

Foreign Communication From a Related Counterpart Application, Chinese Application No. 201380022203.4, Chinese Office Action dated Dec. 27, 2016, 9 pages.

Korean Intellectual Property Office, "Decision of Patent," Application No. KR 10-2014-7022187, Oct. 7, 2019, 4 pages.

* cited by examiner

METHOD AND APPARATUS FOR TRANSCEIVING CHANNEL RELATED TO TERMINAL THAT SUPPORTS HALF DUPLEX TRANSMISSION IN MOBILE COMMUNICATION SYSTEM

CROSS-REFERENCE TO RELATED APPLICATIONS AND CLAIM OF PRIORITY

This application is a continuation of U.S. patent application Ser. No. 14/382,307, filed on Aug. 29, 2014, which is the National Stage of International Application No. PCT/KR2013/001574, filed Feb. 27, 2013, which claims the benefit of U.S. Provisional Patent Application No. 61/604,603, filed Feb. 29, 2012, the disclosures of which are fully incorporated herein by reference as if fully set forth herein.

TECHNICAL FIELD

The present invention relates to a channel transmission/reception method and apparatus of a terminal supporting half duplex transmission in a mobile communication system and, in particular, to a method for controlling downlink transmission in a situation where the terminals supporting the half duplex transmission are not capable of simultaneous uplink transmission and downlink reception and operate in different multicarrier TDD configurations.

BACKGROUND

An LTE system is an OFDMA-based communication system designed to support Frequency Division Duplex (FDD) and Time Division Duplex (TDD). Also, it is designed to support half duplex transmission. The LTE system has been designed for the goal of supporting FDD and TTD on a single carrier in Release 8 and then FDD and TDD on one or more carriers in Release 10 under the assumption that the uplink and downlink transmission directions of the carriers are identical each other in TDD. In addition to those features, Release 11 aims to support the TDD system having the carriers with uplink and downlink transmission directions different in time from each other and the design thereon is under progress.

Meanwhile, it may occur that a plurality of carriers having different TDD configurations are aggregated such that a special subframe and a downlink subframe are scheduled simultaneously at the same subframe duration and thus the uplink part of the special subframe and the downlink subframe conflict each other. This is likely to cause a problem to the terminal operating in the half duplex-duplex mode which cannot transmit and receive at the same time.

In the case of Physical Random Access Channel (PRACH) transmitted in the uplink part of the special subframe, its transmission timing is determined by the terminal and not changed by the base station's scheduling and, if the downlink transmission is suspended at the downlink subframe to guarantee the uplink transmission at the special subframe, this may cause a problem of wasting the frequency resource even when the terminal operates in reception mode at the downlink part of the special subframe.

SUMMARY

The present invention has been conceived to solve the above problems and aims to provide a method of transmitting/receiving channels efficiently in the time duration where uplink and downlink transmissions collide especially when the terminal operates in the half-duplex mode with multiple carriers having different TDD configurations.

In accordance with an aspect of the present invention, a channel transmission/reception method of a terminal operating in a half-duplex mode in a mobile communication system includes receiving scheduling information on multiple carriers with different TDD configurations from a base station, determining whether to receive a downlink channel within a subframe duration in which per-carrier subframes including at least one special subframe coincide, and communicating channels with the base station depending on whether the downlink channel is received.

In accordance with another aspect of the present invention, a channel transmission/reception method of a base station for a terminal operating in a half-duplex mode in a mobile communication system includes determining whether TDD configurations of multiple carriers for channel transmission/reception are identical with each other, determining, when the TDD configurations differ from each other and at least one special subframe and at least one downlink subframe coincide in a same subframe duration, Orthogonal Frequency Division Multiplexing (OFDM) symbols for use in downlink channel transmission in the downlink subframe depending on whether a resource for PRACH transmission is allocated to the terminal in the special subframe, and transmitting a scheduling information on the multiple carriers to the terminal.

In accordance with another aspect of the present invention, a channel transmission/reception apparatus of a terminal operating in a half-duplex mode in a mobile communication system includes a transceiver which receives scheduling information on multiple carriers with different TDD configurations from a base station and communicates channels with the base station and a controller which determines whether to receive a downlink channel within a subframe duration in which per-carrier subframes including at least one special subframe coincide.

In accordance with still another aspect of the present invention, a channel transmission/reception apparatus of a base station for a terminal operating in a half-duplex mode in a mobile communication system includes a controller determines whether TDD configurations of multiple carriers for channel transmission/reception are identical with each other and determines, when the TDD configurations differ from each other and at least one special subframe and at least one downlink subframe coincide in a same subframe duration, Orthogonal Frequency Division Multiplexing (OFDM) symbols for use in downlink channel transmission in the downlink subframe depending on whether a resource for PRACH transmission is allocated to the terminal in the special subframe and a transceiver which transmits a scheduling information on the multiple carriers to the terminal.

The channel transmission/reception method and apparatus of the terminal operating in the half-duplex mode in a mobile communication system according to the present invention is advantageous in terms of improving data transmission efficiency and avoiding simultaneous downlink reception and uplink transmission at the terminal operating in the half-duplex mode in such a way of determining the presence/absence of downlink data channels scheduled at the same time with a special subframe on different carriers and, if present, the length of the downlink data channel according to the presence/absence of PRACH transmission of the terminal at the special subframe and the special subframe configuration in the system aggregation of carriers having different TDD configurations.

DETAILED DESCRIPTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the spirit and scope of the present invention.

Figure 1:
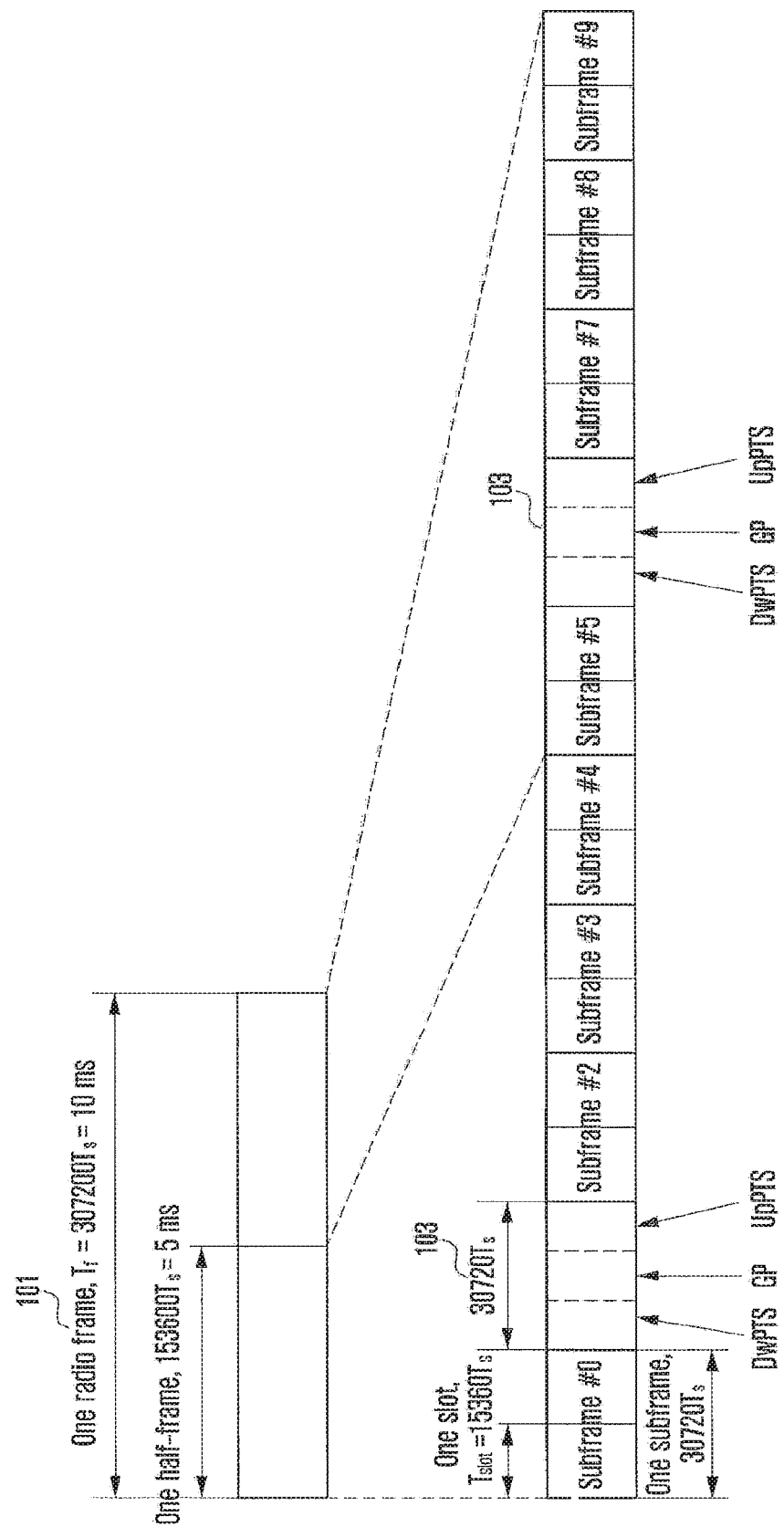
FIG. 1 is a diagram illustrating a configuration of an exemplary structure of a TDD radio frame for use in LTE supporting FDD and TDD.

FIG. 1 is a diagram illustrating a configuration of an exemplary structure of a TDD radio frame for use in LTE supporting FDD and TDD. One radio frame 101 spans 10 ms equal to 30720 Ts where Ts is 1/(1500×2048) seconds. One radio frame consists of 10 subframes, and TDD subframes are classified into three types, i.e. downlink subframe dedicated for use totally in downlink transmission, uplink subframe for use totally in uplink transmission, and special subframe 103 for use partially in downlink transmission and partially in uplink transmission. The special subframe is necessary for switching from downlink transmission to uplink transmission.

The TDD radio frame has one of 7 configurations defined by the kinds of the 10 subframes constituting the radio frame as shown in table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In table 1, 'D' denotes the subframe reserved for downlink transmission, 'U' denotes the subframe reserved for uplink transmission, and 'S' denotes the special subframe.

Figure 2:
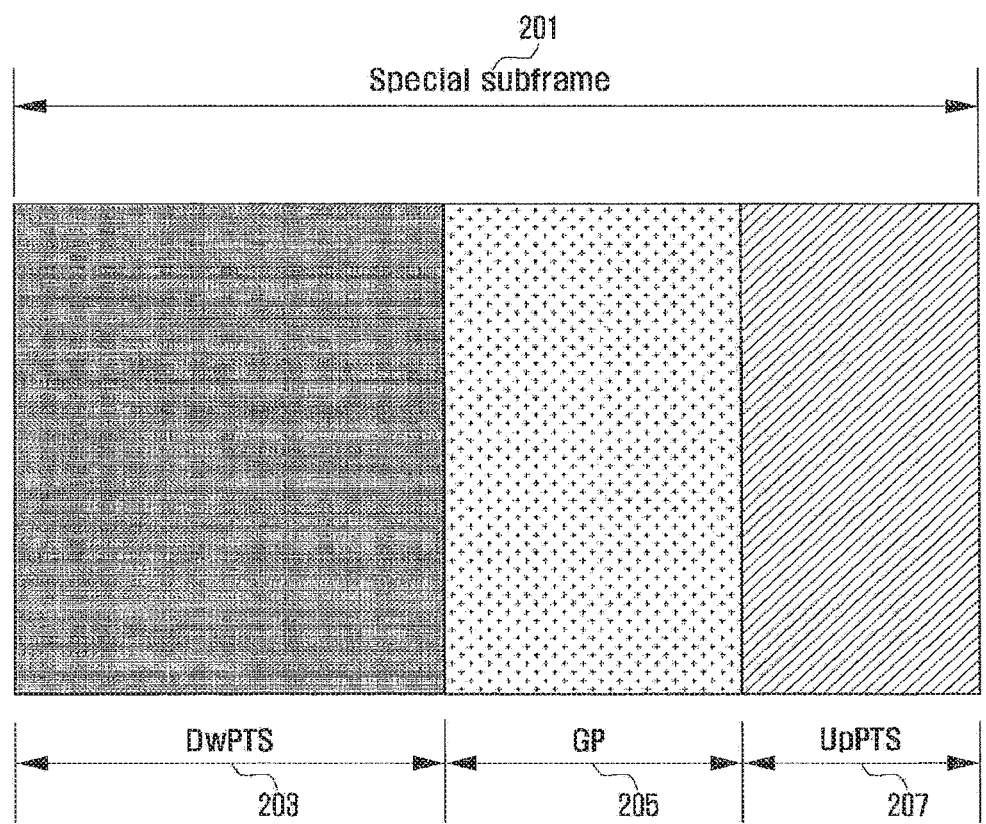
FIG. 2 is a diagram illustrating a detailed configuration of the special subframe.

FIG. 2 is a diagram illustrating a detailed configuration of the special subframe.

As shown in FIG. 2, the special subframe 201 consists of DwPTS field 203 for downlink control channel and data channel transmission, UpPTS field 207 for uplink channel transmission, and Guard Period (GP) 205 for switching from the downlink transmission to the uplink transmission and compensating for propagation delay of the signal, and the lengths of the three fields may vary as shown in table 2.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 2-continued

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

As shown in table 2, there are 9 kinds of special subframe configurations that can be selectively used per carrier or cell and notified from the base station to the terminals.

Unlike the FDD and TDD terminals, the half-duplex terminal may use the downlink and uplink transmission bandwidth in the same way as the FDD or TDD terminal but cannot perform transmission and reception simultaneously. In the LTE and LTE-A systems, whether to support the half-duplex transmission is determined by the base station scheduler which, especially in the FDD mode, controls such that downlink and uplink transmissions do not occur simultaneously on the same frequency. Since the downlink and uplink are on the same frequency band in the TDD mode, the transmission and reception do not occurs simultaneously.

Since the multiple carriers have the same TDD configuration, in Rel. 10, even in the case of using the carrier aggregation, the scheduling of transmission and reception on the multiple carriers is performed in the same way as before. In Rel. 11 supporting the multiple carriers with different TDD configurations, however, uplink-downlink collision may occur at a certain subframe.

Particularly when a special subframe and a downlink subframe occur at the same time, the uplink part of the special subframe collides with some OFDM symbol of the downlink subframe so as to cause a problem in that the terminal fails transmitting/receiving at the corresponding symbols. This is the case where the terminal has the data to receive from the base station at the same time of attempting transmission of PRACH at the uplink part of the special subframe. Prior to starting explanation of an embodiment of the present invention in association of such a case, a described is made of the PRACH transmission of the terminal briefly.

Figure 3:
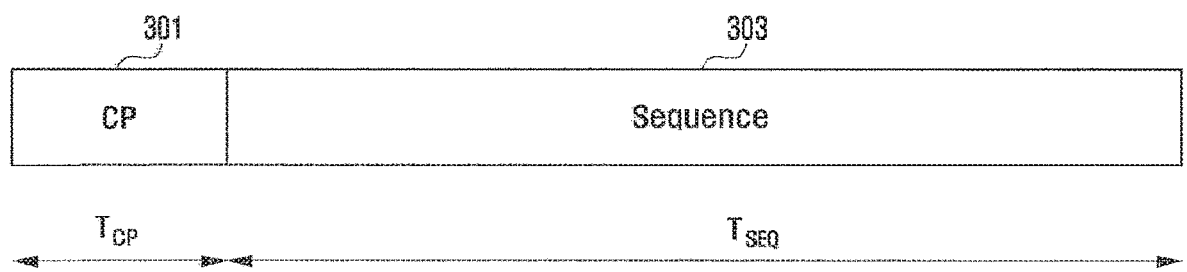
FIG. 3 is a diagram illustrating a transmission format of PRACH.

The terminal transmits PRACH in uplink for initial attach or uplink synchronization. FIG. 3 is a diagram illustrating a transmission format of PRACH. The PRACH is a signal occupying a predetermined frequency region and including a Cyclic Prefix (CP) 301 and a Sequence 303, and the terminals transmit the signals with unique codes in the sequences for identification.

There are four preamble formats characterized by different PRACH sequence and CP lengths.

TABLE 3

| Preamble format | $T_{cp}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |

TABLE 3-continued

| Preamble format | $T_{cp}$ | $T_{SEQ}$ |
|---|---|---|
| 3 | 21024 · $T_s$ | 2 · 24576 · $T_s$ |
| 4 | 448 · $T_s$ | 4096 · $T_s$ |

In table 3, format 4 is used only in subframe type II supporting TDD and, particularly, capable of being transmitted only at the special subframe. The special subframe configuration supporting PRACH format 4 can be used only with the configurations 5, 6, 7, and 8 for the DL normal CP and only with configurations 4, 5, and 6 for the DL extended CP in table 2. The special subframe may carry two types of signals in uplink, i.e. PRACH in the preamble formation 4 of table 3 and Sounding Reference Signal (SRS). For PRACH transmission, the base station determines only the transmission resource while the base station determines the transmission timing.

As described above, in the case of aggregating the carriers having different TDD configurations (one carrier having one of the TDD configurations 0, 1, 2, and 6 of table 1 and the other carrier having one of the TDD configurations 3, 4, and 5 of table 1), the special subframe (S) and downlink subframe (D) may be scheduled simultaneously at the 6$^{th}$ subframe as shown in table 1. As described above, since the special subframe has both the downlink and uplink parts, it causes a problem at the half-duplex terminal which cannot perform transmission and reception simultaneously.

Figure 4:
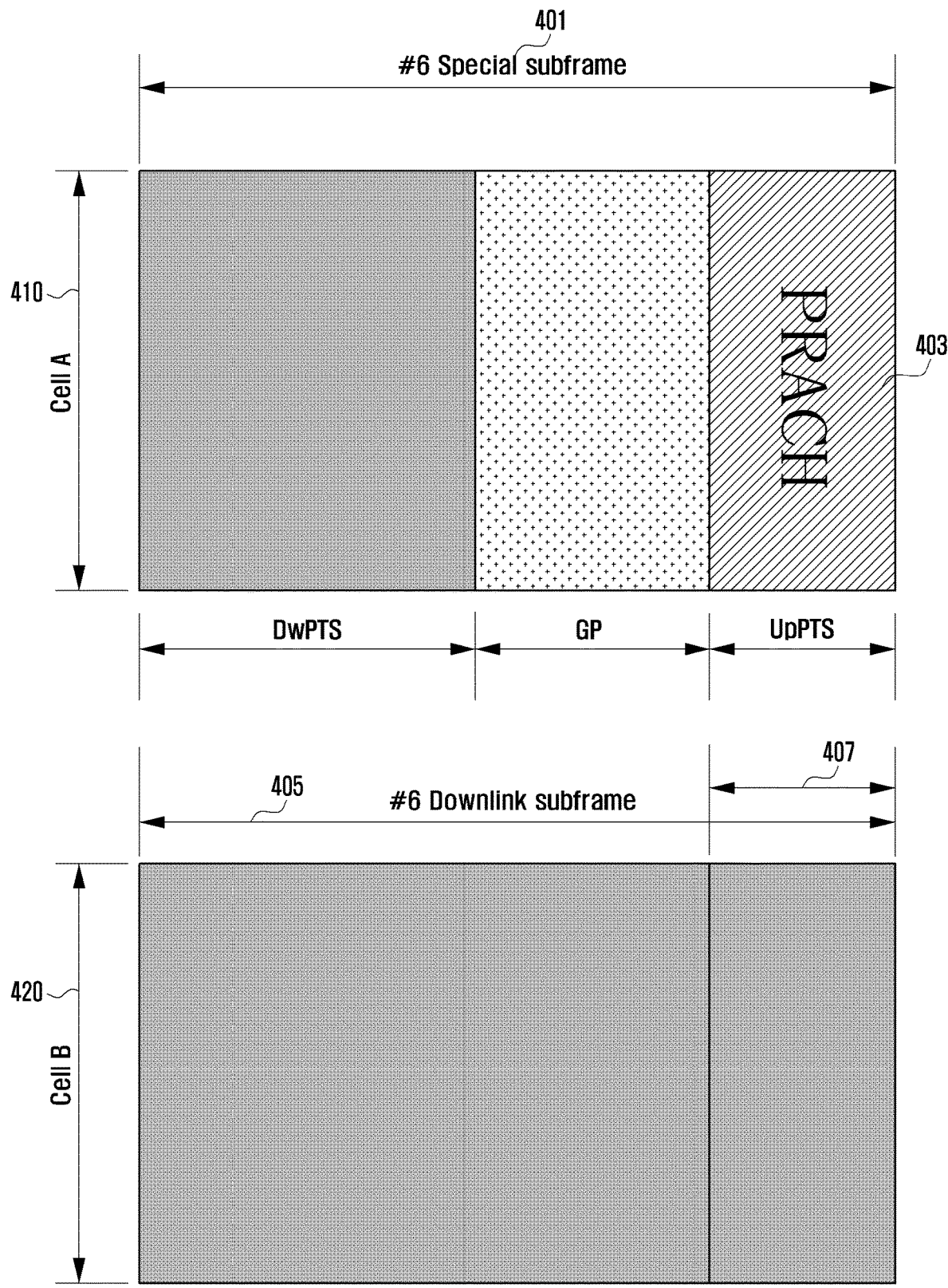
FIG. 4 is a diagram illustrating a situation where a special subframe and downlink subframe coexist simultaneously.

FIG. 4 is a diagram illustrating a situation where a special subframe and downlink subframe coexist simultaneously. Referring to FIG. 4, the cell A 410 has one of the TDD configurations 0, 1, 2, and 6 of table 1, and the cell B 420 has one of the TDD configurations 3, 4, and 5 of table 1. Accordingly, the 6$^{th}$ subframe of the cell A 410 is the special subframe 401, and the 6$^{th}$ subframe of the cell B 420 is the downlink subframe 405. Here, the cell A 410 may be the Primary Cell (PCell), and the cell B 420 may be a Secondary Cell (SCell).

As shown in FIG. 4, the special subframe 401 includes both the downlink and uplink parts, the terminal operating in the half-duplex mode fails to simultaneous transmission and reception at the duration 407 where the downlink subframe 405 of the cell B 420 and the uplink part 403 of the special subframe 401 of the cell A collide.

In this case, since the PRACH transmission timing is determined by the terminal, the base station cannot schedule uplink transmission at the corresponding duration to avoid uplink-downlink collision and, if suspending the downlink transmission in the cell B 420 to guarantee the uplink transmission, the terminal cannot use, even when it is performing downlink reception operation in the cell A 410, the frequency resource.

In order to solve the above problems, the terminal according to an embodiment of the present invention determines whether to perform downlink reception based on at least one of the presence/absence of PRACH in the special subframe and special subframe configuration. Hereinafter, a description is made of the method of controlling whether to receive downlink channel at the subframe where uplink and downlink transmission collide in the case where a plurality of carriers having different TDD configurations are aggregated according to an embodiment of the present invention.

Figure 5:
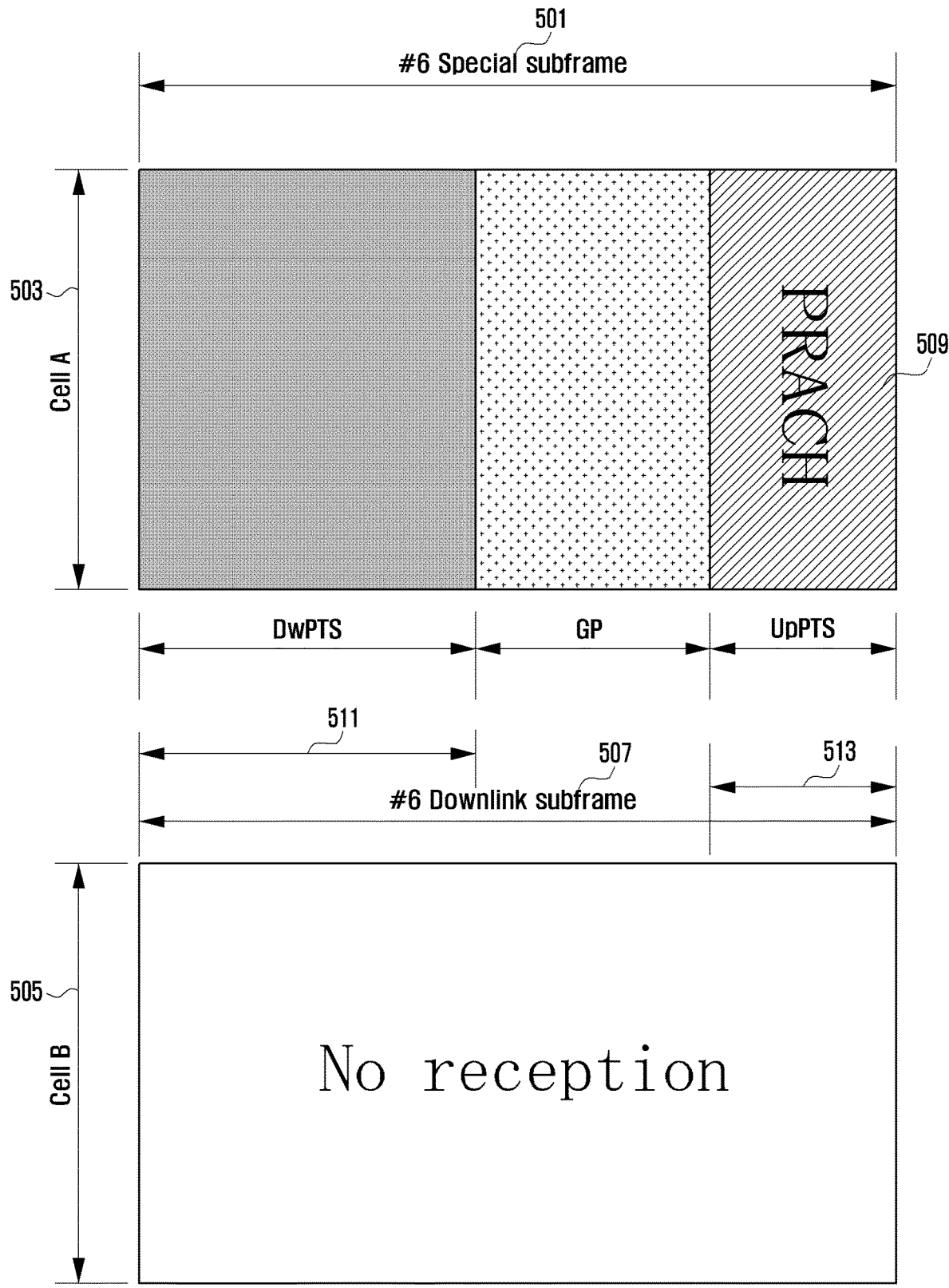
FIG. 5 is a diagram illustrating a situation where a terminal receives a downlink channel from a base station according to the first embodiment of the present invention.

FIG. 5 is a diagram illustrating a situation where a terminal receives a downlink channel from a base station according to the first embodiment of the present invention. In FIG. 5, the cell A 503 and the cell B 505 use different TDD configurations in which the $6^{th}$ subframe 501 of the cell A 503 is a special subframe and the $6^{th}$ subframe 507 of the cell B 505 is a downlink subframe.

Referring to FIG. 5, if it is necessary for the terminal operating in the half-duplex mode to transmit PRACH at uplink part 509 of the special subframe 501 of the cell A 503, the terminal receives no signal in the cell B 505 independently of the downlink transmission of the base station in the cell B.

Accordingly, the terminal receives the signal at the downlink part (DwPTS) of the special subframe 501, switches to uplink during the GP, and transmits PRACH at the uplink part (UpPTS) 509. If there is not PRACH transmission in the special subframe 501, the terminal receives the downlink signal through the cell B 507.

Since the terminal determines whether to receive downlink signal in the downlink subframe 507 coexisting with the special subframe 501 depending on whether to transmit PRACH in the special subframe 501, it is advantageous for the terminal to transmit PRACH always independently of the scheduling of the base station. If the base station has scheduled downlink transmission in the cell B 505, downlink retransmission is performed.

According to the first embodiment of the present invention, if no downlink signal is received in the downlink subframe 507 coexistent with the special subframe 501, it is advantageous in terms of solving the problem occurring at the region 513 of the downlink subframe 507 which collides with the uplink part (UpPTS) of the special subframe but disadvantageous in terms of wasting frequency resource even though it is possible to receive downlink signal at the part 511 overlapped with the downlink part (DwPTS) of the special subframe.

Another embodiment of the present invention proposes a method of using the time duration capable of receiving downlink signal in the downlink subframe partially overlapped with the special subframe insofar as possible.

Figure 6:
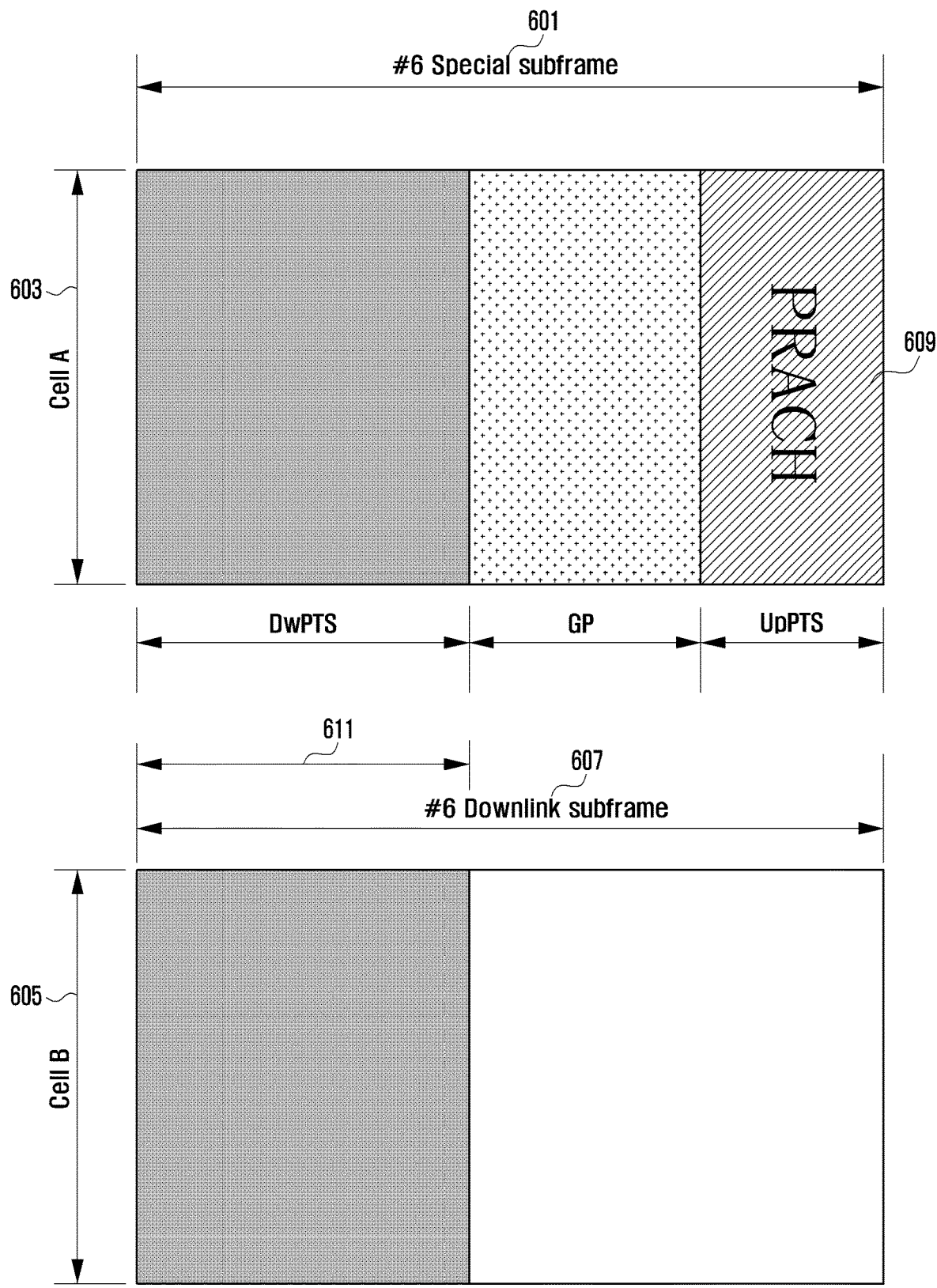
FIG. 6 is a diagram illustrating a situation where a terminal receives a downlink channel from a base station according to the second embodiment of the present invention.

FIG. 6 is a diagram illustrating a situation where a terminal receives a downlink channel from a base station according to the second embodiment of the present invention. The embodiment of FIG. 6 is directed to the case of receiving downlink signal at the duration, in the downlink subframe, corresponding to the DwPTS of the special subframe independently of PRACH transmission of the terminal.

Referring to FIG. 6, at the time when the special subframe 601 is configured in the cell A 603 and the downlink subframe 607 in the Cell B 605 for the terminal operating in the half-duplex mode, the terminal receives the downlink signals in the downlink part (DwPTS) of the special subframe 601 in both the cells 603 and 605 under the assumption that the downlink subframe 607 of the cell B 605 is configured in the same structure as the special subframe 601 of the cell A 603 and, if PRACH transmission is necessary, transmits the PRACH in the uplink part (UpPTS) of the cell A 603.

Here, the cell 1 603 may be the Primary Cell (PCell), and the cell B 605 is the Secondary Cell (SCell). According to the second embodiment of the present invention as depicted in FIG. 6, if the PCell has the special subframe and the SCell has the downlink subframe 607 in the same subframe duration, the terminal does not receive any signal from the base station in the SCell at the OFDM symbols overlapped with at least one of the GP and UpPTS of the PCell.

As shown in FIG. 6, in the case that the terminal operating in the half-duplex mode receives the special subframe 601 in the cell A 603 and the downlink subframe 607 in the cell B 605, if the resource for PRACH transmission is allocated to the terminal in the uplink part (UpPTS) 609, the base station configures the data channel of the downlink subframe 607 of the cell B to be coincident with the downlink part (DwPTS) of the special subframe of the cell A 603. Otherwise if no PRACH transmission resource is configured in the uplink part (UpPTS) 609, the data channel destined to the terminal may be transmitted in the whole downlink subframe 607 of the cell B 605.

Accordingly in the case that it is necessary to transmit PRACH in the uplink part (UpPTS) 609 of the special subframe 601, the terminal receives the downlink data during the downlink part (DwPTS) of the special subframe 601 in the cell A 601 and during the part 611 of the downlink subframe 607 which matches the DwPTS of the special subframe 601.

According to the second embodiment of the present invention, the terminal is capable of securing downlink data regions as much as the downlink part (DwPTS) always on all the carriers so as to improve the data transmission efficiency as compared to the first embodiment.

If the base station configures the resource for PRACH transmission in the uplink part (UpPTS), it is necessary to match the part 611 allocated for downlink transmission in the downlink subframe 607 to the downlink part (DwPTS) of the special subframe 601, the size of the control channel region decreases as compared to the legacy case. This is because the maximum symbol size of the control channel is 2 in the special subframe and 3 in the downlink subframe.

In summary, in the case that the terminal operating in the half-duplex mode receives the special subframe 601 in the cell A 603 and the downlink subframe 607 in the cell B 605, the transmitter of the terminal operates in match with the symbol structure of the special subframe of the cell A 603, at least with the GP and UpPTS, so as to receive the downlink symbols by means of the receiver of the terminal in the cell B 605 within the corresponding time duration.

Figure 7A:
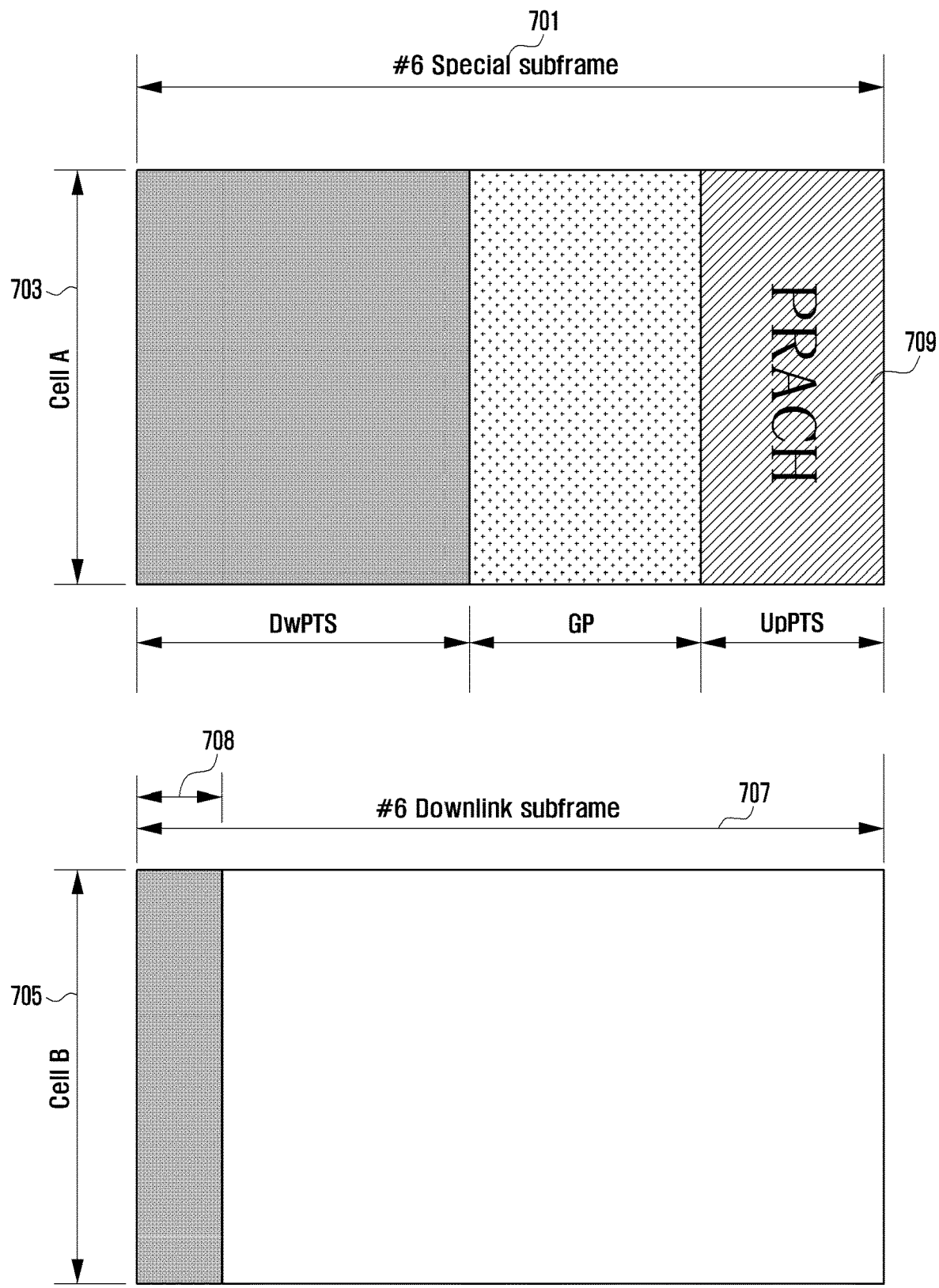
FIGS. 7A and 7B are diagrams illustrating situations where the terminal receives downlink channel from the base station according to the third embodiment of the present invention.
Figure 7B:
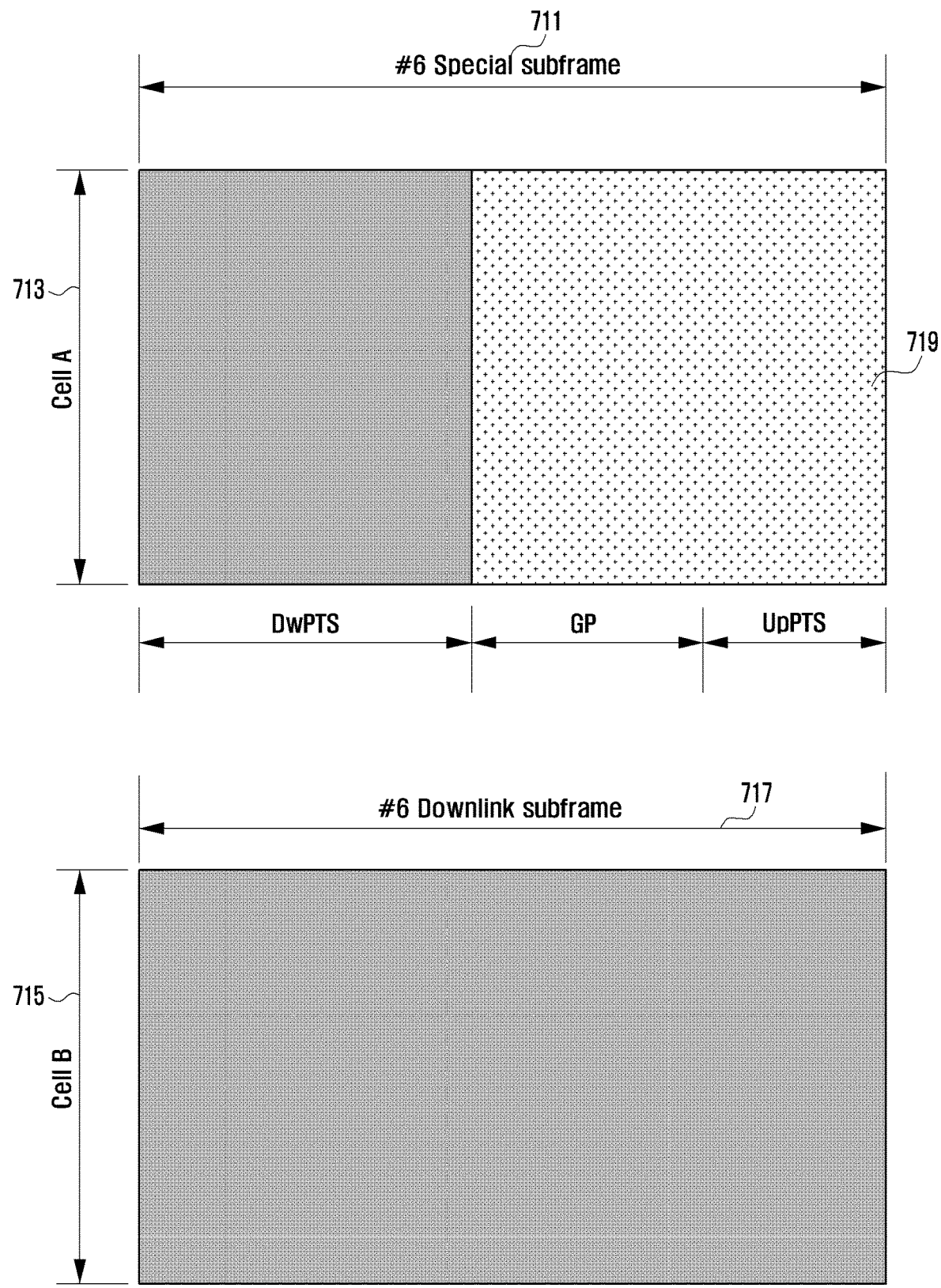

FIGS. 7A and 7B are diagrams illustrating situations where the terminal receives downlink channel from the base station according to the third embodiment of the present invention. The embodiment of FIGS. 7A and 7B is directed to the case where the terminal checks the scheduling information transmitted by the base station in downlink independently of PRACH transmission of the terminal.

Referring to FIG. 7A, in the case that the special subframe 701 is configured in the cell A 703 and the downlink subframe 707 is configured in the cell B 705 simultaneously for the terminal operating in the half-duplex mode, if the downlink data channel resource allocation and transmission format, i.e. DL grant, is demodulated successfully in the downlink subframe 707 of the cell B 705, the terminal receives the data channel of the cell B 705 and the downlink signal in the DwPTS of the special subframe 701 in the cell A 703.

Otherwise if it fails to demodulate the DL grant in the downlink subframe 707 of the cell 705, the terminal stops receiving downlink signal in the cell B 705 but receives the downlink signal at the downlink part (DwPTS) of the special subframe 701 of the cell A 703 and, if necessary, transmits PRACH at the uplink part (UpPTS).

According to the third embodiment of the present invention, the terminal receives the control channel (PDCCH) in the downlink subframe of the cell B705 at least and, if there is no DL grant transmitted by the base station in the downlink subframe 707, receives no downlink signal in the data region of the cell B 705. However, the terminal may receive uplink control channel of the control region of the corresponding downlink subframe 707.

In detail, the terminal receives the control channel region 709 of the downlink subframe 707 first and checks the scheduling information for data channel transmission in the cell B 705. If there is no downlink scheduling information, the terminal does not receive symbols following the control channel region 708 and, if necessary, transmits PRACH at the uplink part 709 of the special subframe 701. At this time, the terminal may check the control channel for uplink transmission regardless of the existence of the downlink scheduling information.

Referring to FIG. 7B, if the terminal receives the downlink control channel successfully, it receives the data channel in the whole downlink subframe 707 of the cell B 715 and the downlink part (DwPTS) of the special subframe of the cell A 713 and skips transmission of PRACH at the uplink part (UpPTS) 719 of the special subframe 711 of the cell A 713.

If the base station does not permit transmission of the control channel for downlink transmission in the downlink subframe 707 of the cell B 705, the terminal may check the control channel for uplink transmission at the control channel region (PDCCH) of the downlink subframe 707 under the assumption that the symbols following the control channel (PDCCH) of the downlink subframe 707 of the cell B 705 carries no downlink signal.

In detail, assuming that the cell A 703 is the primary cell (PCell) and the cell B 705 is the secondary cell (SCell), if it fails to demodulate the DL grant received in the control channel region of the downlink subframe of the SCell which is coincident with the special subframe of the PCell, the terminal does not receive the downlink signals such as PDSCH, E-PDCCH, PMCH, and PRS in the data channel region of the downlink channel region.

According to the third embodiment, the base station is capable of scheduling the data channel freely regardless of PRACH transmission of the terminal, and the terminal is capable of determining whether to transmit PRACH through determination on presence/absence of scheduling so as to avoid unnecessary PRACH transmission. If the terminal needs to transmit PRACH and if the base station schedules data channel transmission for PRACH transmission of the terminal, the PRACH transmission may be delayed; however, since the base station does not perform scheduling any longer until the synchronization with the terminal is acquired, the terminal may secure the time for PRACH transmission.

Figure 8A:
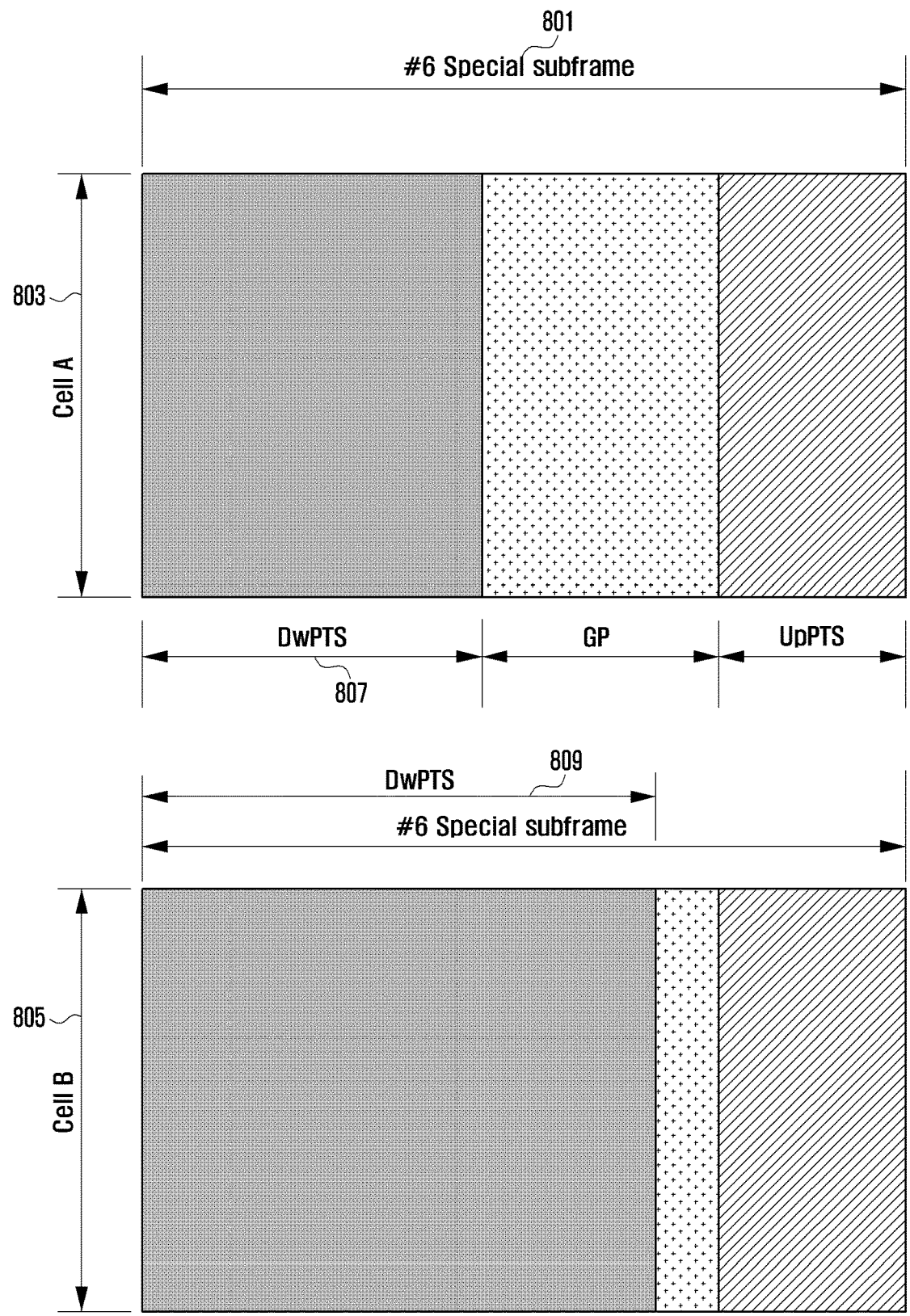
FIGS. 8A and 8B are diagrams illustrating situations where the terminal receives downlink channel from the base station according to the fourth embodiment of the present invention.
Figure 8B:
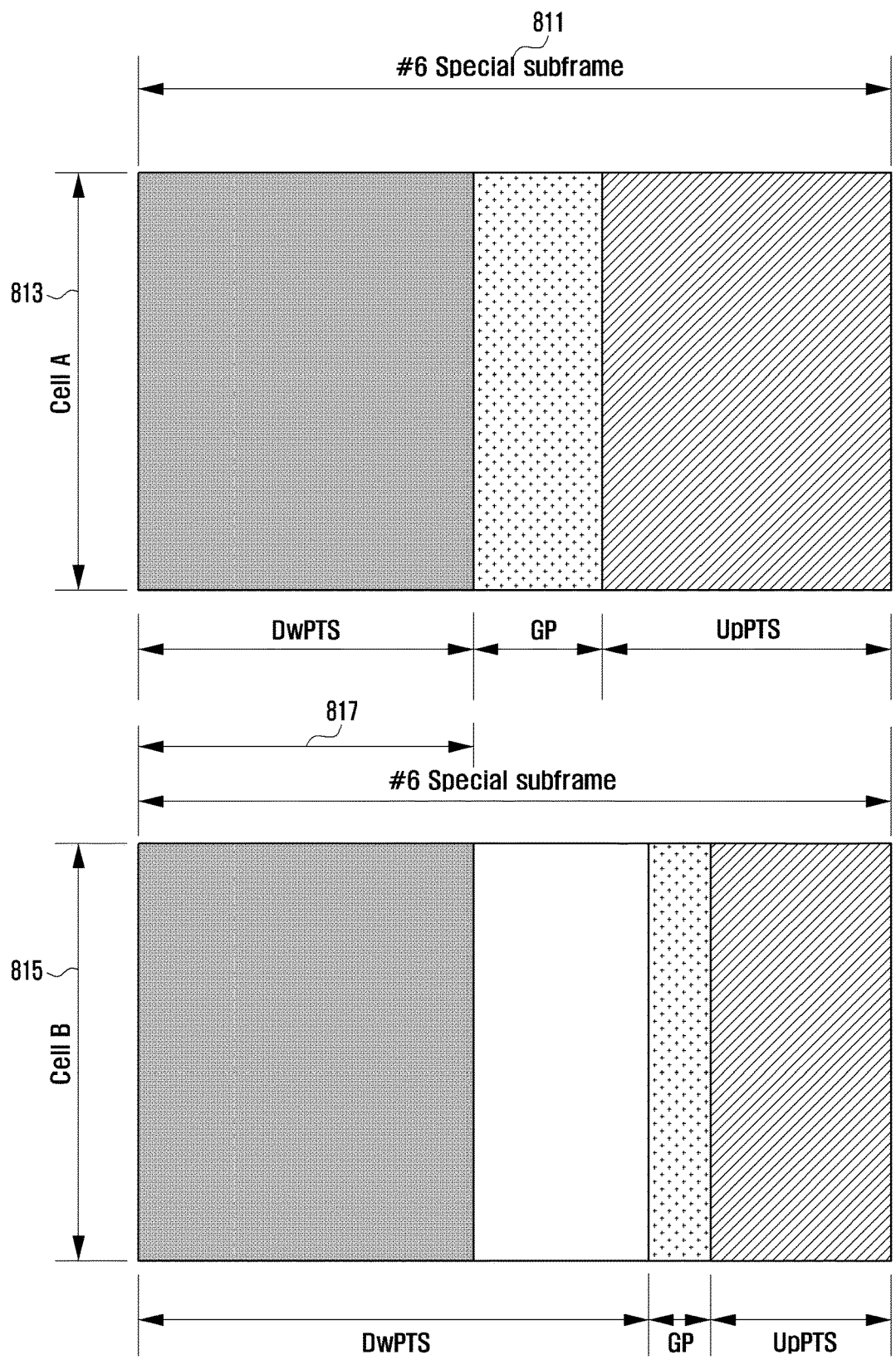

FIGS. 8A and 8B are diagrams illustrating situations where the terminal receives downlink channel from the base station according to the fourth embodiment of the present invention. The embodiment of FIGS. 8A and 8B is directed to the case of determining the downlink signal reception time duration according to the lengths of the downlink and uplink parts when a plurality of special subframes with different configurations are transmitted coincidently.

Referring to FIG. 8A, assuming that the special subframe configuration of the cell A 803 is X and the special subframe configuration of the cell B 805 is Y in association with the terminal operating in the half-duplex mode, the terminal determines whether the lengths of the uplink parts (UpPTS) of the special subframe configurations X and Y are identical with each other.

If the uplink parts (UpPTS) of the two special subframes are identical in length with each other, the terminal receives the downlink channel in the downlink parts (DwPTS) of the respective special subframes. That is, the terminal receives the downlink channel at the downlink part (DwPTS) 807 according to the special subframe configuration X in the cell A 803 and at the downlink part (DwPTS) 809 according to the special subframe configuration Y in the cell B 805.

In the case that the uplink parts (UpPTS) of the two special subframes are identical in length with each other, it is possible, although the terminal receives the downlink channel through the longest downlink part (DwPTS), for the terminal to switch to the uplink part (UpPTS) for uplink channel transmission during the Guard Period (GP).

Referring to FIG. 8B, if the uplink parts (UpPTS) of the special subframe configurations X and Y are different in length from each other, the terminal performs downlink channel reception based on the special subframe configuration having the longest uplink part (UpPTS).

That is, if the respective special subframes appearing simultaneously in the cell A 813 and cell B 815 are different in length from each other, the terminal receives the downlink symbols as many as the length of the downlink part (DwPTS) 817 of the special subframe 811 of the cell A 813 because the UpPTS of the special subframe 811 of the cell A 813 is the longest one.

In the case that the special subframe configurations differ from each other as shown in FIGS. 8A and 8B, the length of the downlink reception part is determined depending on whether the lengths of the UpPTSs of the special subframes are identical with each other so as to minimize downlink data channel transmission efficiency degradation caused by the difference in length between the special subframe configurations.

Figure 9:
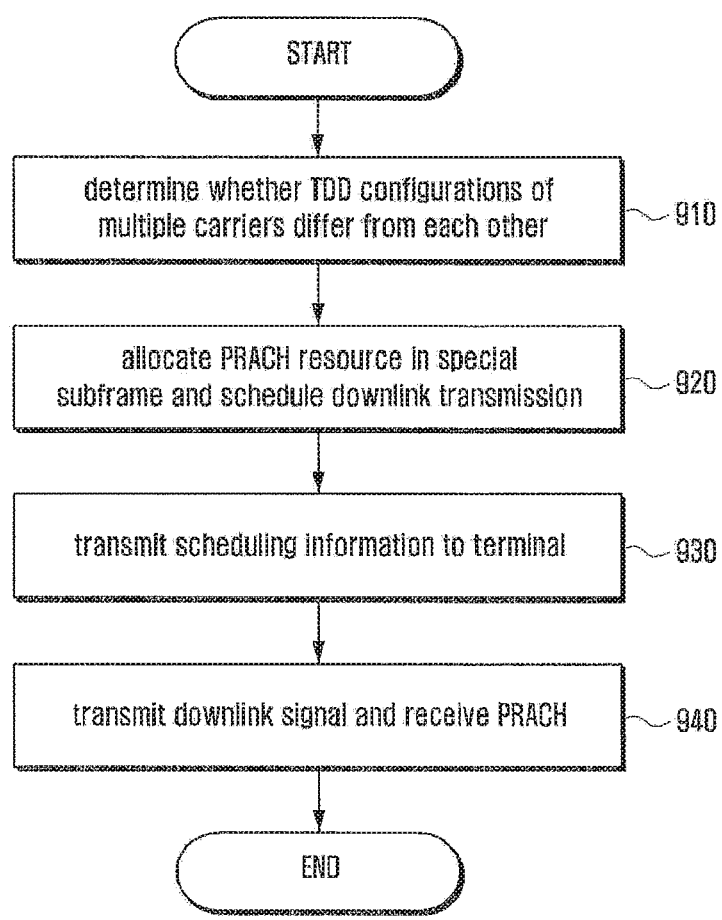
FIG. 9 is a flowchart illustrating a procedure for the base station to determine the scheduling information to be transmitted to the terminal for uplink and downlink communication with the terminal according to an embodiment of the present invention.

FIG. 9 is a flowchart illustrating a procedure for the base station to determine the scheduling information to be transmitted to the terminal for uplink and downlink communication with the terminal according to an embodiment of the present invention.

Referring to FIG. 9, the base station determines whether the TDD configurations of the multiple carriers for use in communication with the terminal are different from each other at step 910. An embodiment of the present invention is applied to the case where the TDD configurations are different from each other especially when the special subframe and downlink subframe are coincident in the same subframe duration or when the special subframes structured in different configurations are coincident in the same subframe duration.

The base station allocates PRACH resource in the special subframe and calculates a number of symbols for use in downlink transmission to perform scheduling at step 920. Particularly when the PRACH transmission resource is allocated in the special subframe according to the second embodiment of the present invention as described above, the base station may set the number of OFDM symbols of the control channel region and the data channel region of the downlink subframe coincident with the special subframe in the same subframe duration to a value equal to the downlink part of the special subframe. If there is not downlink transmission, the number of symbols for downlink transmission is set to 0.

Next, the base station generates the scheduling information and transmits the scheduling information to the terminal at step 930 and transmits the downlink channel to the terminal and receives PRACH from the terminal at step 940. At this time, whether to receive PRACH is determined depending on whether the terminal transmits the PRACH.

Figure 10:
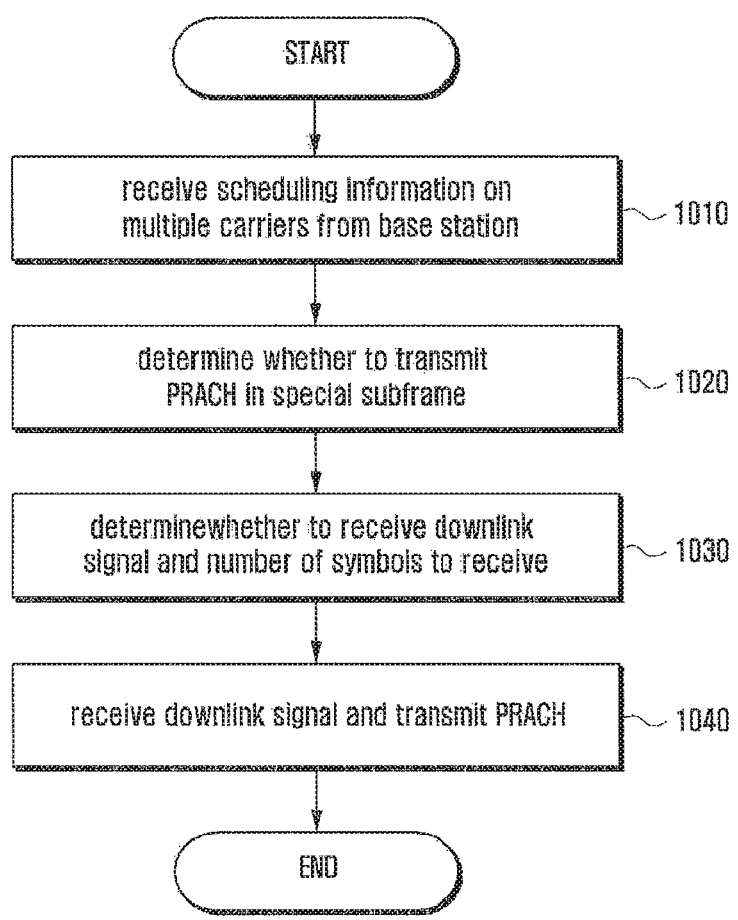
FIG. 10 is a flowchart illustrating a procedure for the terminal to receive the scheduling information from the base station and perform uplink and downlink communication based thereon according to an embodiment of the present invention.

FIG. 10 is a flowchart illustrating a procedure for the terminal to receive the scheduling information from the base station and perform uplink and downlink communication based thereon according to an embodiment of the present invention.

Referring to FIG. 10, the terminal receives the scheduling information on the multiple carriers from the base station at step 1010. Next, the terminal determines whether to transmit PRACH in the special subframe at step 1020 and determines whether to perform downlink reception at the downlink subframe coincident with the special subframe or other coincident special subframes structured in different configurations in the same subframe duration and a number of symbols for downlink receptions at step 1030.

In detail, if it is determined to transmit PRACH in the special subframe according to the first embodiment of the present invention, the terminal may determine to not receive downlink channel in the downlink subframe coincident with the special subframe in the same subframe duration according to the first embodiment or may determine to receive the downlink channel only at the OFDM symbols of the downlink subframe which correspond to the downlink part of the special subframe in the same subframe duration according to the second embodiment.

According to the third embodiment, if the DL grant is demodulated successfully in the control channel region of the downlink subframe regardless of PRACH transmission, it is possible to determine whether to receive downlink data channel in the data channel region. In the case that the special subframes different in configuration occur coincidently in the same subframe duration, it is possible to determine whether to perform downlink reception and the number of symbols therefor depending on whether the UpPTS lengths of the special subframes are identical with each other according to the fourth embodiment of the present invention.

According to an embodiment of the present invention, the terminal receives the downlink channel and transmits PRACH based on the determination result at step 1040.

Figure 11:
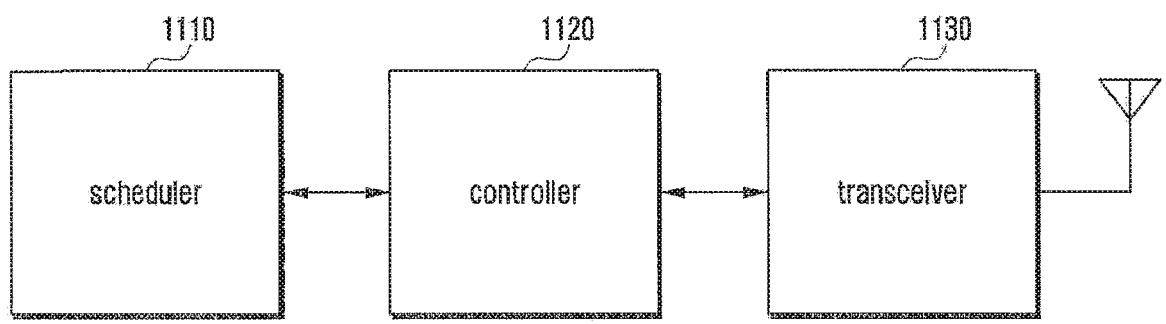
FIG. 11 is a block diagram illustrating a configuration of the base station for communicating uplink and downlink channel with the terminal according to an embodiment of the present invention.

FIG. 11 is a block diagram illustrating a configuration of the base station for communicating uplink and downlink channel with the terminal according to an embodiment of the present invention. Referring to FIG. 11, the base station according to an embodiment of the present invention includes a scheduler 1110, a controller 1120, and a transceiver 1130.

The scheduler 1110 generates the scheduling information to be transmitted to the terminal under the control of the controller 1120. Particularly when the TDD configurations of the multiple carriers are different from each other, it may be possible to determine PRACH transmission resource and the number of downlink transmission symbols in the subframe duration in which the special subframe and the downlink subframe occur coincidently or the special subframes different in configuration occur coincidently.

The transceiver 1130 transmits the generated scheduling information to the terminal and, afterward, transmits downlink channel to the terminal and receives the PRACH from the terminal.

Figure 12:
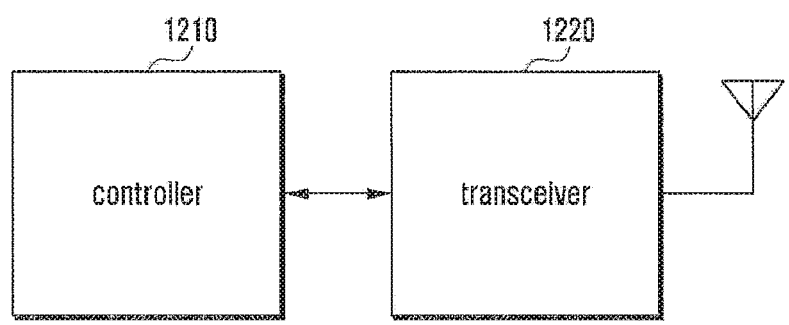
FIG. 12 is a block diagram illustrating a configuration of the terminal for communicating uplink and downlink channel with the base station according to an embodiment of the present invention.

FIG. 12 is a block diagram illustrating a configuration of the terminal for communicating uplink and downlink channel with the base station according to an embodiment of the present invention. Referring to FIG. 12, the terminal according to an embodiment of the present invention may include a controller 1210 and a transceiver and operate in the half-duplex mode in which uplink transmission and downlink transmission cannot be performed simultaneously.

If the transceiver receives the scheduling information transmitted by the base station, the controller 1210 determines whether to perform downlink reception and the number of symbols therefor in the subframe duration in which the special subframe and the downlink subframe occur coincidently or the special subframes different in configuration occur coincidently, based on at least one of presence/absence of PRACH transmission and a special frame configuration according to an embodiment of the present invention.

The transceiver 1220 receives the downlink channel from the base station and transmits PRACH to the base station under the control of the controller 1210.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method to receive data by a user equipment (UE) in a wireless communication system, the method comprising:
receiving first time division duplex (TDD) uplink-downlink configuration information for a first cell and second TDD uplink-downlink configuration information for a second cell;
determining whether a subframe in the first cell is a special subframe and a same subframe in the second cell is a downlink subframe according to the first and second TDD uplink-downlink configuration information; and
determining not to receive at least one of physical downlink shared channel (PDSCH), enhanced physical downlink control channel (EPDCCH), physical multicast channel (PMCH) or positioning reference signal (PRS) in the second cell in the same subframe, in case that the subframe in the first cell is the special subframe and the same subframe in the second cell is the downlink subframe,
wherein the special subframe includes downlink pilot time slot (DwPTS), uplink pilot time slot (UpPTS), and guard period (GP).

2. The method of claim 1, further comprising:
determining not to receive any other signals on the second cell in orthogonal frequency division multiplexing (OFDM) symbols that overlap with the GP or the UpPTS in the first cell, in case that the subframe in the first cell is the special subframe and the same subframe in the second cell is the downlink subframe.

3. The method of claim 1, wherein the subframe in the first cell comprises a subframe number 6, and the same subframe in the second cell phone comprises a subframe number 6.

4. The method of claim 1, wherein the first TDD uplink-downlink configuration information comprises at least one of uplink-downlink configuration number 0, 1, 2 or 6.

5. The method of claim 1, wherein the second TDD uplink-downlink configuration information comprises at least one of uplink-downlink configuration number 3, 4 or 5.

6. A method for receiving data by a user equipment (UE) operating in a half-duplex mode in a wireless communication system, the method comprising:
receiving first time division duplex (TDD) uplink-downlink configuration information for a first cell and second TDD uplink-downlink configuration information for a second cell;
determining whether a subframe in the first cell is a special subframe and a same subframe in the second cell is a downlink subframe according to the first and second TDD uplink-downlink configuration information; and
determining not to process at least one of physical downlink shared channel (PDSCH), enhanced physical downlink control channel (EPDCCH), physical multicast channel (PMCH) or positioning reference signal (PRS) in the second cell in the same subframe, in case that the subframe in the first cell is the special subframe and the same subframe in the second cell is the downlink subframe,
wherein the special subframe includes downlink pilot time slot (DwPTS), uplink pilot time slot (UpPTS), and guard period (GP).

7. The method of claim 6, further comprising:
determining, not to process any other signals on the second cell in orthogonal frequency division multiplexing (OFDM) symbols that overlap with the GP or the UpPTS in the first cell, in case that the subframe in the first cell is the special subframe and the same subframe in the second cell is the downlink subframe.

8. The method of claim 6, wherein the subframe in the first cell comprises a subframe number 6, and the same subframe in the second cell comprises a subframe number 6.

9. The method of claim 6, wherein the first TDD uplink-downlink configuration information comprises at least one of uplink-downlink configuration number 0, 1, 2 or 6.

10. The method of claim 6, wherein the second TDD uplink-downlink configuration information comprises at least one of uplink-downlink configuration number 3, 4 or 5.

11. A user equipment (UE) operating in a half-duplex mode for receiving data in a wireless communication system, the UE comprising:
a transceiver configured to transmit and receive signals; and
a controller configured to:
receive first time division duplex (TDD) uplink-downlink configuration information for a first cell and second TDD uplink-downlink configuration information for a second cell,
determine whether a subframe in the first cell is a special subframe and a same subframe in the second cell is a downlink subframe according to the first and second TDD uplink-downlink configuration information, and
determine not to receive at least one of physical downlink shared channel (PDSCH), enhanced physical downlink control channel (EPDCCH), physical multicast channel (PMCH) or positioning reference signal (PRS) in the second cell in the same subframe, in case that the subframe in the first cell is the special subframe and the same subframe in the second cell is the downlink subframe,
wherein the special subframe includes downlink pilot time slot (DwPTS), uplink pilot time slot (UpPTS), and guard period (GP).

12. The UE of claim 11, wherein the controller is further configured to determine not to receive any other signals on the second cell in orthogonal frequency division multiplexing (OFDM) symbols that overlap with the GP or the UpPTS in the first cell, in case that the subframe in the first cell is the special subframe and the same subframe in the second cell is the downlink subframe.

13. The UE of claim 11, wherein the subframe in the first cell comprises a subframe number 6, and the same subframe in the second cell comprises a subframe number 6.

14. The UE of claim 11, wherein the first TDD uplink-downlink configuration information comprises at least one of uplink-downlink configuration number 0, 1, 2 or 6.

15. The UE of claim 11, wherein the second TDD uplink-downlink configuration information comprises at least one of uplink-downlink configuration number 3, 4 or 5.

16. A user equipment (UE) operating in a half-duplex mode for receiving data in a wireless communication system, the UE comprising:
a transceiver configured to transmit and receive signals; and
a controller configured to:
receive first time division duplex (TDD) uplink-downlink configuration information for a first cell and second TDD uplink-downlink configuration information for a second cell,
determine whether a subframe in the first cell is a special subframe and a same subframe in the second cell is a downlink subframe according to the first and second TDD uplink-downlink configuration information, and
determine not to receive at least one of physical downlink shared channel (PDSCH), enhanced physical downlink control channel (EPDCCH), physical multicast channel (PMCH) or positioning reference signal (PRS) in the second cell in the same subframe, in case that the subframe in the first cell is the special subframe and the same subframe in the second cell is the downlink subframe,
wherein the special subframe includes downlink pilot time slot (DwPTS), uplink pilot time slot (UpPTS), and guard period (GP).

17. The UE of claim 16, wherein the controller is further configured to determine not to receive any other signals on the second cell in orthogonal frequency division multiplexing (OFDM) symbols that overlap with the GP or the UpPTS in the first cell, in case that the subframe in the first cell is the special subframe and the same subframe in the second cell is the downlink subframe.

18. The UE of claim 16, wherein the subframe in the first cell comprises a subframe number 6, and the same subframe in the second cell comprises a subframe number 6.

19. The UE of claim 16, wherein the first TDD uplink-downlink configuration information comprises at least one of uplink-downlink configuration number 0, 1, 2 or 6.

20. The UE of claim 16, wherein the second TDD uplink-downlink configuration information comprises at least one of uplink-downlink configuration number 3, 4 or 5.

* * * * *